US00RE45678E

(19) United States
(12) Reissued Patent
Schwarzenbach et al.

(10) Patent Number: US RE45,678 E
(45) Date of Reissued Patent: Sep. 29, 2015

(54) AUTO-LOCK COMPACT ROPE DESCENT DEVICE

(71) Applicant: Sterling Rope Company, Inc., Biddeford, ME (US)

(72) Inventors: Peter M. Schwarzenbach, Marblehead, MA (US); Samuel Morton, Gorham, ME (US)

(73) Assignee: Sterling Rope Company, Inc., Biddeford, ME (US)

(21) Appl. No.: 14/625,987

(22) Filed: Feb. 19, 2015

Related U.S. Patent Documents

Reissue of:
(64) Patent No.: 8,376,081
Issued: Feb. 19, 2013
Appl. No.: 12/637,052
Filed: Dec. 14, 2009

U.S. Applications:
(60) Provisional application No. 61/162,472, filed on Mar. 23, 2009.

(51) Int. Cl.
*A62B 1/14* (2006.01)

(52) U.S. Cl.
CPC ..... *A62B 1/14* (2013.01)

(58) Field of Classification Search
CPC ..... A62B 1/14
USPC ..... 182/5, 193, 192
See application file for complete search history.

(56) References Cited

U.S. PATENT DOCUMENTS 106,812 A * 8/1870 Griswold ..... 188/65.5
210,928 A * 12/1878 Duryea ..... 182/5
368,075 A * 8/1887 Diss ..... 182/72
440,161 A * 11/1890 Jeffers ..... 182/193
524,481 A 8/1894 Fowler
524,841 A * 8/1894 Fowler ..... 293/16
560,391 A 5/1896 Checkley
592,582 A * 10/1897 Dempster ..... 182/192

(Continued)

FOREIGN PATENT DOCUMENTS

GB 2024912 A 1/1980
GB 2256673 A 12/1992
GB 2323120 A 9/1998

OTHER PUBLICATIONS

Gary D. Storrick, Small Single Rope Technique Whaletails, http://storrick.cnhost.com/VerticalDevicesPage/Rappel/FixMultiPages/FixMulti410.html, Jan. 13, 2002, USA.

(Continued)

*Primary Examiner* — William Doerrler
(74) *Attorney, Agent, or Firm* — Clock Tower Law Group; Erik J. Heels; Michael A. Bartley

(57) ABSTRACT

A descent control device is disclosed manufactured with a bar having holes for guiding a rope used in descent, and a lever designed to pivot or move relative to the bar and compress the opening of one of the holes. Compressing the opening increases friction and slows or stops descent. Control can be from manually moving the lever or by connecting the lever to the descending weight, thereby automatically moving the lever. Hole and pivot geometry may be altered to provide multiple braking options, accommodate varying ropes, and alter normal operating friction.

3 Claims, 7 Drawing Sheets

(56) References Cited

U.S. PATENT DOCUMENTS

| | | | | |
|---|---|---|---|---|
| 1,187,754 | A | 6/1916 | Da Costa Lyra | |
| 1,600,747 | A | 11/1926 | Yurkovitch | |
| 3,357,520 | A | 12/1967 | Foote | |
| 4,226,305 | A | 10/1980 | Frestad | |
| 4,474,262 | A | 10/1984 | Himmelrich | |
| 4,576,248 | A * | 3/1986 | Marom | 182/5 |
| 4,596,314 | A | 6/1986 | Rogelja | |
| 4,883,146 | A | 11/1989 | Varner | |
| 5,131,491 | A | 7/1992 | Varner | |
| 5,156,240 | A | 10/1992 | Ostrobrod | |
| 5,544,723 | A | 8/1996 | Gettemy | |
| 5,597,052 | A | 1/1997 | Rogleja | |
| 5,850,893 | A | 12/1998 | Hede | |
| 5,954,153 | A | 9/1999 | Rogelja | |
| 6,029,777 | A | 2/2000 | Rogelja | |
| 2003/0075392 | A1 | 4/2003 | Rogelja | |
| 2006/0090963 | A1 * | 5/2006 | Liao | 182/193 |
| 2008/0302600 | A1 | 12/2008 | Murray | |

OTHER PUBLICATIONS

Petzl, GRGRI Self-braking belay device, http://www.pretzl.com/en/outdoor/belay-devices/grigi, (device shown on page introduced in 1991), USA.

Petzl, Stop Self-braking descender for single rope, http://www.petzl.com/en/outdoor/descenders/stop, (device shown on page introduced at least as early as 2007), USA.

* cited by examiner

AUTO-LOCK COMPACT ROPE DESCENT DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This utility patent application] *This reissue application has been filed for the reissue of U.S. patent application Ser. No. 12/637,052 now U.S. Pat. No. 8,376,081 titled "AUTO-LOCK COMPACT ROPE DESCENT DEVICE" naming Peter M. Schwarzenbach and Samuel Morton as inventors, which* claims priority from U.S. provisional patent application Ser. No. 61/162,472 filed Mar. 23, 2009, titled "AUTO-LOCK COMPACT ROPE DESCENT DEVICE" in the name of Peter M. Schwarzenbach and Samuel Morton.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2009, Sterling Rope Company, Inc.

BACKGROUND OF THE INVENTION

1. Field of the Invention

This invention relates to descent control devices, and more particularly to devices that control the descent of a person or other load supported by rope or other cable.

The descent device market is a broad market that encompasses a wide range of devices intended to control the descent of persons or objects on a vertical rope or cable. Such devices vary significantly depending on the specific intended purpose; such purposes include providing a controlled descent of an individual by another (a belay), a solo descent in a sport environment (such as rock climbing or caving), a controlled descent for tactical or rescue purposes, or an emergency egress from a building, tower or other structure. Due to the varying purposes, descent devices range from very simple (merely a carabiner or fixed "Figure 8" with a wrap of rope) to quite complex and heavy (e.g. a lever box like a Rollgliss). Sport market devices are more often light and simple, yet they require significant training to set up and use properly. Industrial versions are often very heavy and complex in order to allow the device to provide a very controlled descent with little input from the operator, including a fail safe "auto-stop" feature which automatically stops the descent if the operator is unable to operate the device (such as due to an accident or incapacity). Recently, emergency descent devices for first responders have become more prevalent, and have attempted to provide pre-rigged, simple devices that can be carried on a firefighter's person at all times in order to allow for emergency egress from buildings. While such devices have borrowed from a variety of existing devices, none has provided all of the simplicity and functionality of the proposed device.

2. Description of Prior Art

The original method of lowering oneself to the ground, a body rappel wrapping a rope around one's body, was painful on long and free-hanging drops. In the old days of fat manila rope it could be tolerated, but as thinner nylon lines came into popular use, the technique has almost disappeared from routine use. Long before the new ropes came into play, people were already looking for a better way to rappel using mechanical devices of various kinds. The basic principle of a rappel or descent device is to provide a friction surface over which a rope passes thereby slowing the descent as the person's potential energy is transferred into heat. In all cases the combination of the friction surface and the perpendicular force exerted on that surface generates the necessary total friction to slow the descent. The force exerted perpendicular to the friction surface has traditionally been provided by curving the rope around the surface and applying "back-tension" exerted on the free end of the rope by the hand of the operator. If the friction surface is limited (such as with a carabiner discussed below), the amount of tension required to be exerted on the free end of the rope can be significant (often causing significant discomfort, if not burning of the rope in ones hand). In order to provide additional friction surface to overcome this requirement, often the rope path is long and sinuous and/or the device applies extra mechanical pressure on the rope as it passes over the surface thereby increasing the friction, and hence the control over the descent. In some methods, cams act against the rope in order to apply such pressure; in other methods, pressure is applied by increasing the length of winding of the path (either by repeated wraps or by increasing the length of the device to extend the surface over which the rope passes). In many cases, the geometry of the device is variable and can be adjusted by the operator by means of a handle or lever. In some devices, the geometry is designed to "auto lock" or "auto stop" the descent when the individual releases the device (such as in an accidental fall or incapacitation).

There are many categories of modern descent devices:

Carabiners: the most basic method of controlling one's descent is by means of wrapping a rope around a carabiner or other metal ring, either singly or in combination, using a variety of hitches or other rope arrangements. The control is exerted by varying the backpressure on the rope using a free hand. Occasionally, brake bars are added to a carabiner, which aids in the control. While such devices are ubiquitous, the method requires proper configuration of a hitch (such as the Munter hitch) and continuous handling of the rope in order to properly control the descent. If the operator fails to control the free hand, the results will be an uncontrolled descent.

Figure 8's: These are fixed cast or milled devices shaped loosely like the figure "8". As in carabiners, the rope is varyingly threaded through the device in order to provide friction. Figure 8's are small, light and relatively inexpensive, but have the same drawbacks as carabiners in that they require proper rigging and attentive handling.

Hooks and Horns: This is a broad category of fixed devices including any shaped bar or hook over and around which ropes are snaked or wrapped in order to create friction. Again, similar to Figure 8's they are light and relatively inexpensive while requiring a level of skill to operate properly.

Bobbins: Bobbins are mechanical descenders where the rope path follows an S-shaped path from bottom to top. In general the braking surface consists of two non-rotating bollards fixed to a side plate, with a second pivoting side plate provided to keep the rope from jumping off the other end of the bollards. A third (usually smaller) bollard may be provided. The attachment point for the individual usually attaches to holes in extensions of the two side plates; these holes are aligned when the side plates pivot to the closed position. Examples would be the Petzl SIMPLE or STOP (auto-stop).

Fixed Multi-bar devices: These devices consist of an arrangement whereby the rope snakes around at least three fixed bars or bollards, often machined out a single piece of metal. An example would be the Whaletail.

Moving Multi-Bar Devices: Similar to a simple bollard, the rope snakes around at least three bollards, but the geometry is such that the bollards compress against one another thereby increasing friction. The compression is controlled by a lever or screw, thereby modulating the friction. An example would be the Gemini Rescue Equipment Gemlock. These devices can be quite effective although they are often large and cumbersome.

Racks: Devices with frames that accept a number of brake bars arranged similar to a ladder, at least some of which can slide on the frame. J-frame racks have an open side; U-frame racks do not. In either case, the rope is snaked around the "rungs" causing a circuitous path and creating friction. Because the bars collapse on themselves, the inherent friction in the device can be quite high, thereby making the amount of "back tension" required to undertake a long controlled descent very manageable.

Spools: Devices where the rope wraps around a fixed drum. The drum axis can be horizontal or vertical. Friction is varied by varying the number of wraps.

Lever Boxes: Lever boxes are devices with (1) a body with a complex rope channel milled, cast, or otherwise formed into it, (2) a cover plate, and (3) a lever that allows the rappeller to control the descent, yet automatically stops the descent if the rappeller lets go (an auto-stop feature). The enclosed rope path provides some protection, although it can be a liability in heavy mud. Lever boxes tend to be complex, and the cost of manufacturing is accordingly high. They are also often large and heavy. Examples would be the Petzl Grigri, the Rollgliss and the RIT Rescue and Escape Systems F.I.R.E.-A.L.

U.S. Pat. No. 5,131,491 "Descent Controller" (Varner, 07-21-1992) is an example of a variation of a spool type descender, with an alternate ladder capstan also disclosed.

U.S. Pat. No. 5,597,052 "Descender" (Rogleja, 01-28-1997) is an example of a bobbin type descender.

U.S. Pat. No. 5,850,893 "Self-Locking Descender for a Rope with an Operating Lever" (Petzl, 12-22-1998) is another example of a bobbin type descender covering variations of the Petzl STOP device.

All of the above devices fall into either the category of simple devices that are extremely limited in their ability to control one's descent without significant training and setup time or complex devices that are either heavy, complicated to operate, expensive to manufacture or susceptible to damage and wear.

BRIEF SUMMARY OF THE INVENTION

The device consists simply of two pieces: (1) a fixed bar of metal through which several holes have been drilled for passing a rope through and (2) a lever which is fitted into a center slot in the lower portion of the bar longitudinally with its handle protruding from the side. The combined bar and lever have one concentric hole drilled through them for additional passage of the rope. The lever is hinged with the bar and has an attachment point drilled at its bottom end through which a carabiner or other attachment device is threaded. The attachment point is offset from the hinge point and the concentric hole thereby providing torque to open the lever when the device is weighted by the rappeller. To operate the device, a rope is threaded through the bar, passing from one hole back through the next. Finally the rope is threaded through the concentric hole in the bar and lever. While the rope is attached to a fixed point from which a descent is desired, the rappeller is attached to the attachment point on the lever by means of a carabiner or other hardware. The weight of the operator opens the lever, thereby squeezing the rope in the bottom hole between the sides of the bar and the lever in a scissors action, increasing the friction throughout the device. By relieving the pressure on the lever by squeezing the bar and lever combination, the operator can control the descent of the device. In the event that the operator fails to operate the device or is unable to do so due to incapacity, the device automatically locks off and stops the descent.

Features and Advantages

Simplicity: the device consists of only two pieces (plus hinge pin) with no moving part other than the lever. There are no springs or other elements, such as covers or locking pins, to maintain and replace if worn out. This dramatically simplifies manufacture.

Reliability: Often devices are dragged through the mud, and the resulting grit and grime contaminate sensitive bearings, cams, and locks such that the devices fail to operate properly. Because of the essentially fixed nature of the device's main bearing surfaces (simply holes drilled through a solid bar), the device is reliable and easy to maintain. The specific contour of the holes (which have quarter-round edges back to back) allows the rope to travel in a smooth path. The rope path is external and visible and mud and grit are easily washed off and the condition of the path capable of being visibly confirmed. In this respect it is similar to a fixed bar device, although with a lever control and auto-stop feature.

Obvious and simple operation: other descent devices are sometimes extremely complex in the way they need to be set up. This device is intuitive in its operation, with the threading of the device obvious to the user. While some devices can be opened to allow for attachment to a rope without threading from the end, this feature often complicates the device and confuses the operator. Some lever box devices are pinned shut by the manufacturer in order to not allow users to thread the device in the field, requiring them to return them to the factory.

Compact: because of its simple construction, the device is light and small. Since the rope's path is linear along the axis of the device, the device need not be much wider than the width of the rope being used. In addition, when the lever is in the squeezed position, the lever nests conveniently alongside the device, allowing the device to stow compactly in a carrying bag along with a pre-rigged rope.

Flexible: Since varying demands require different amounts of friction (e.g. depending on the weight of the operator or the stiffness or size of the rope being used), the device can be rigged in varying ways: for example, if a slower, more controlled descent is desired or if the rope being utilized is thin or flexible, the rope can be passed through all of the holes. However, if the load is lighter (e.g. a small, light firefighter) or a stiffer or thicker rope is being used, the device can be rigged without using all of the holes.

Multiple Permutations: By varying during manufacture the exact geometry of the lever, specifically its offset relationship between the attachment point, rope hole, hinge pin and lever angle, the device may be made to perform in a wide variety of different environments and manners.

BRIEF DESCRIPTION OF THE DRAWINGS

In the drawings, closely related figures and items have the same number but different alphabetic suffixes.

DETAILED DESCRIPTION OF THE INVENTION, INCLUDING THE PREFERRED EMBODIMENT

Terminology

Figures 1A, 1B:
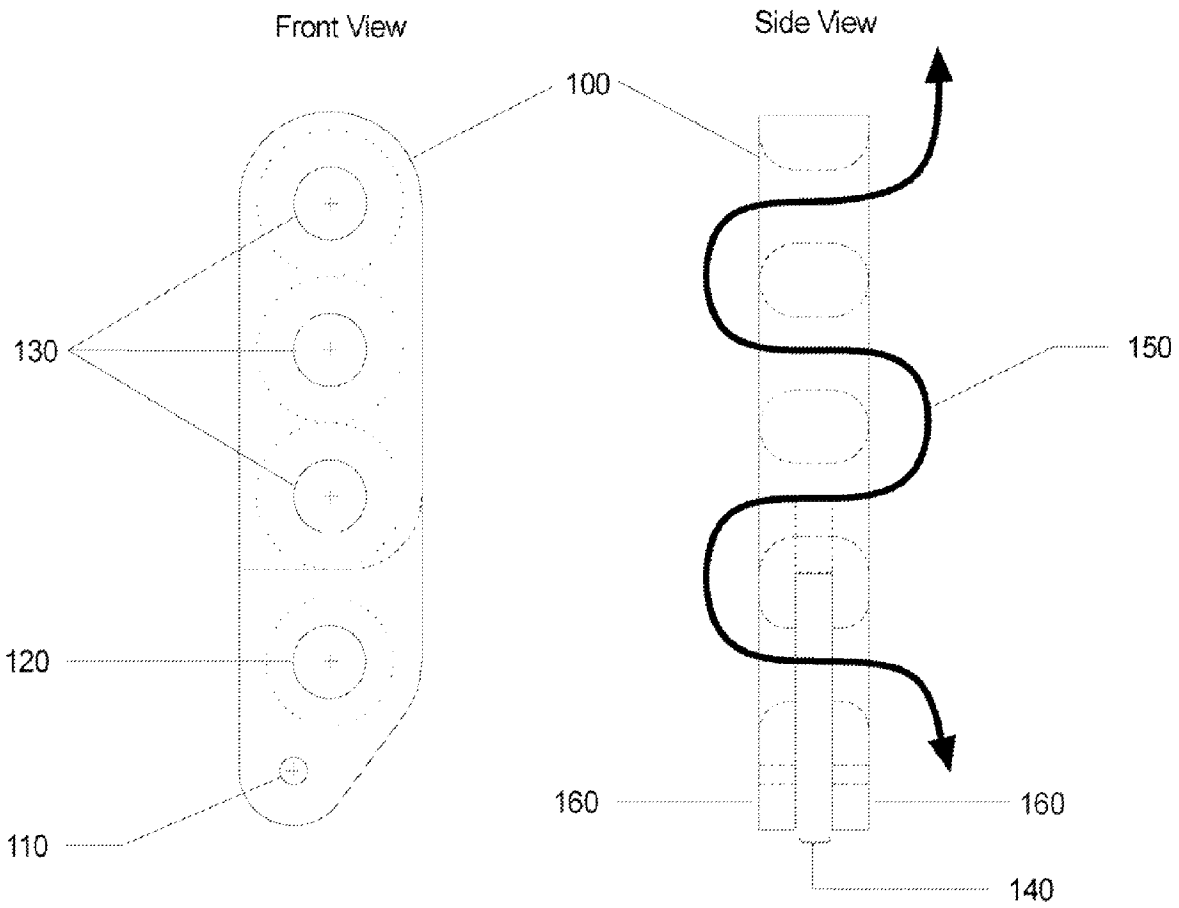
FIG. 1a is a front view of the bar.
FIG. 1b is a side view of the bar with a rope threaded through it.
Figures 2A, 2B:
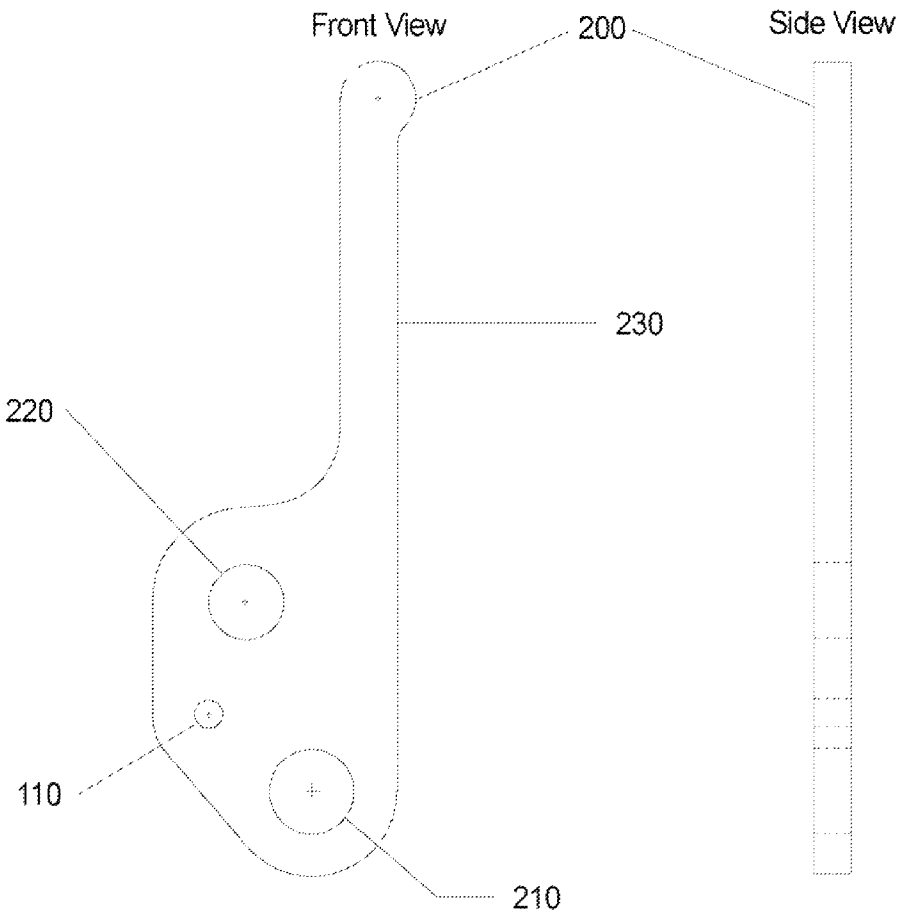
FIG. 2a is a front view of the lever.
FIG. 2b is a side view of the lever.
Figure 3B:
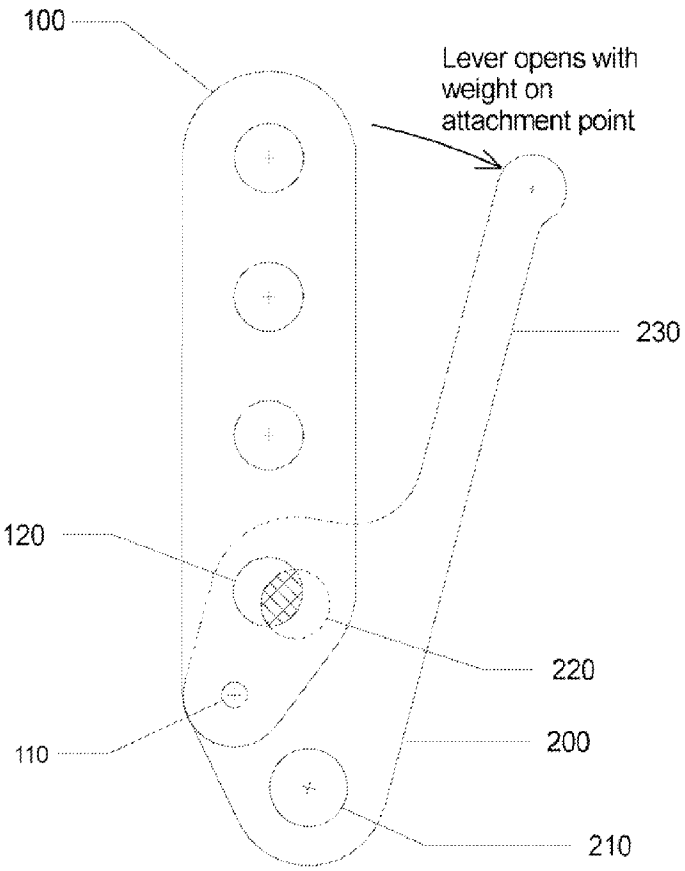
FIG. 3b is a front view of the device in a closed position.
Figure 3A:
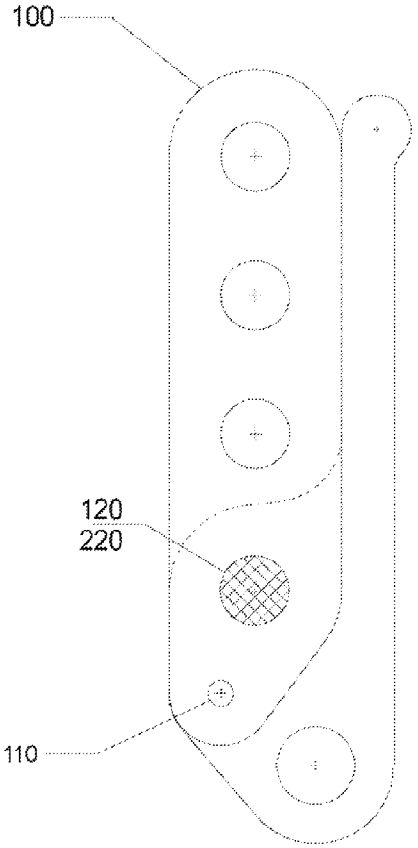
FIG. 3a is a front of the device in a fully open position.

The terminology and definitions of the prior art are not necessarily consistent with the terminology and definitions of the current invention. Where there is a conflict, the following definitions apply.

"Load" means the individual who is rappelling with the device or other object being lowered that is attached.

"Hinge" or "Hinge Pin" means a rod, pin, bolt or other item that acts as a pivot point and connects the bar and lever to form the device.

"Rope" means a rope, cable, or other linear tension device made of any material, including metal or natural or synthetic fiber.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Referring to FIGS. 1a, 1b, 2a, 2b, 3a & 3b, the invention consists of two pieces through which a rope may be threaded and to which a rappeller or other load may be attached with a carabiner or other hardware. The pieces consist of bar 100 and lever 200. In a preferred embodiment, Lever 200 may be fitted into slot 140 in bar 100. Lever 200 and bar 100 may be pivotally connected together at one corner, for example with hinge pin 110. Bar 100 and lever 200 also may be pivotally joined but oriented alternatively, such as on different planes.

Bar 100 may contain one of more rope path holes 130 drilled through bar 100. In a preferred embodiment the holes are arranged in a line to simplify use and configuration of the device and avoid entanglement possibilities. Alternative non-linear hole alignments may be desirable to allow alternate shapes and sizes of bar 100. The surface edge of each hole may be rounded such that the holes increase from a minimum diameter at a central depth in bar 100 to a maximum diameter at the surface of bar 100. This curvature to the edging of holes 130, coupled with the spacing of the holes, enables rope 150 to travel in a smooth approximately circular path as the rope exits and enters bar 100 when passed back and forth through holes 130. The number of holes and their size may be varied depending on the weight of the load and the stiffness, surface friction characteristics, and size of the rope used in the device and the resulting performance desired. At the lower end of bar 100, an additional rope control hole 120, aligned with and having a rounded edge similar to holes 130, may be drilled. If bar 100 and lever 200 are configured in alternative alignments, rope control hole 120 also may be configured in alternative alignment so that control hole 120 aligns with a constricting mechanism of lever 200. The length and width of bar 100 need only be sufficient to support the drilled holes and connecting hinge pin 110. The top of bar 100 may be smoothed and curved to avoid snagging the rope during operation, and the width at the bottom of bar 100 may be minimized to accommodate hinge pin 110. Alternate widths, lengths, and shape of bar 100 may be made to accommodate gripping the device or for any aesthetic purpose.

Perpendicular to hole 120, and laterally in the center of bar 100, slot 140 may be cut into bar 100 and may extend from the bottom of bar 100 upwards beyond hole 120 towards but not to holes 130. Slot 140 may separate bar 100 into two exterior bars 160, with hole 120 passing through both exterior bars. Slot 140 may be left out in order to allow operation in alternative configuration including pivot of lever 200 in a non-parallel direction.

In a preferred embodiment, lever 200 may consist of a plate of thickness slightly less that the depth of slot 140 and of width slightly greater than the width of bar 100. Lever 200 may nest within slot 140 with a portion of lever 200 extending outside the length of bar 100 and forming handle 230 for lever 200. An additional portion of lever 200 may extend below bar 100 and enclose attachment hole 210, to which a load may be attached by means of a carabiner or other attachment hardware. Constriction hole 220 may be drilled in lever 200 such that when bar 100 and lever 200 are assembled lever 200 may be rotated such that hole 220 and hole 120 are approximately concentric. Rotation of lever 200 may be enabled by hinged connection to bar 100. For example, hinge pin 110 may connect lever 200 to bar 100 to enable such rotation. In one embodiment rotation on hinge pin 110 to concentric alignment of hole 220 with hole 120 further positions lever 200 such that handle 230 may align parallel to holes 130. In alternate configurations including operation without slot 140, lever 200 may be any desired thickness and width.

To utilize the device, rope 150 may be passed through the device in a path defined by the holes in bar 100. The operator may utilize all of the holes 130 or less than all depending on the desired performance. Increasing the number of holes utilized increase friction on rope 150 during descent operation, enabling controlled descents of greater weight loads. In addition to utilizing holes 130, and to enable full stop functionality of the device, the rope may be threaded through concentric holes 120 and 220.

In a standard use embodiment, the rope entering holes 130 may attach to a fixed point or otherwise be secured at the top of a descent, and the load may be attached to attachment hole 210. As the load is applied at attachment hole 210, lever 200 may pivot on hinge pin 110, thereby causing holes 120 and 220 to diverge laterally and the resulting opening to diminish. As lever 200 fits between exterior bars 160, lever 200 may act as a middle bar pressing rope 150 between exterior bars 160. This resulting scissors action may squeeze rope 150 and increase the friction at hole 120. The resulting back tension on the rope may also increase the friction at holes 130. In alternate configurations, lever 200 may close a constricting mechanism on pivot, thereby increasing friction and squeezing rope 150.

The operator may modulate the friction in hole 120, and thereby the total friction in the device, by squeezing handle 230 of lever 200 in varying amounts. In addition, the total friction may be modulated by the operator using a free hand to apply back tension on rope 150 extending out of the device from holes 120 and 220, similar to the method used to brake a descent with many other devices. Operation may consist of a combination of the two methods, with one hand operating lever 200 and the other retaining control of the free end of rope 150.

The specific geometry of the device, namely the sizes of holes 130, 120 and 220, and the relative locations of hinge pin 110, holes 120 and 220, and attachment hole 210 may be varied to create alternate embodiments providing specific characteristics for the performance of the device depending on the desired load and the characteristics of the rope being utilized.

In a preferred embodiment, the device may be configured to provide an auto-stop feature whereby failure by the operator to squeeze lever 200 allows lever 200 to rotate under load until the opening between holes 120 and 220 is reduced sufficiently to cause enough friction in the device to decelerate the load to a full stop. This feature may be desirable in multiple situations, including, but not limited to, in emergency egress or other situations when a rappeller is unable to hold onto the rope with either hand as both hands are used to maneuver the operator out of a window or other situation. In such a situation the device may automatically lock off and prevent the rappeller from rapidly descending. Once out of the window or other similar situation, the rappeller may then squeeze lever 200 as desired to control the descent.

An alternative method of operation of the device may be to use it as a belay device. The device may be inverted and attachment hole 210 may be attached to a fixed point or to the belaying operator. The rope exiting from holes 130 may be attached to the individual or other load being lowered. By squeezing lever 200, rope 150 may be played out through the device, thereby lowering the load.

In an example embodiment that works with ½" and smaller rope and includes an auto-stop, bar 100 may be manufactured such that three holes 130 and rope control hole 120 may each have a minimum ½" diameter and curve to a maximum diameter of 1". Holes 130 may be spaced in a row with one inch between centers, with the center of each hole approximately ⅝" from both edges of bar 100. Hole 120 may be aligned with holes 130 and positioned with 1⅛" between the center of hole 120 and the center of the lowest of the three holes 130. Hinge pin 110 may be aligned with its center approximately ¾" below the center of hole 120 and approximately ⅜" from the edge of bar 100. Lever 200 may be manufactured with a maximum width of 1 11/16" when aligned such that constricting hole 220 is approximately concentric with hole 120 and lever 200 is connected to bar 100 by hinge pin 110. Constricting hole 120 may have a ½" diameter. Attachment hole 210 may have a ⅝" diameter. The center of attachment hole 210 may be aligned approximately 1¼" below the center of hole 220, and approximately 1 1/16" from the edge of lever 200. Lever 200 may be angled below hinge pin 110 and curved around attachment hole 210 to minimize size. Handle 230 may extend along the length of bar 100, with the length of handle 230 approximately 3⅜" from the center of hole 220. Handle 230 may have a rounded top for gripping and control purposes.

Other Embodiments

Figure 4C:
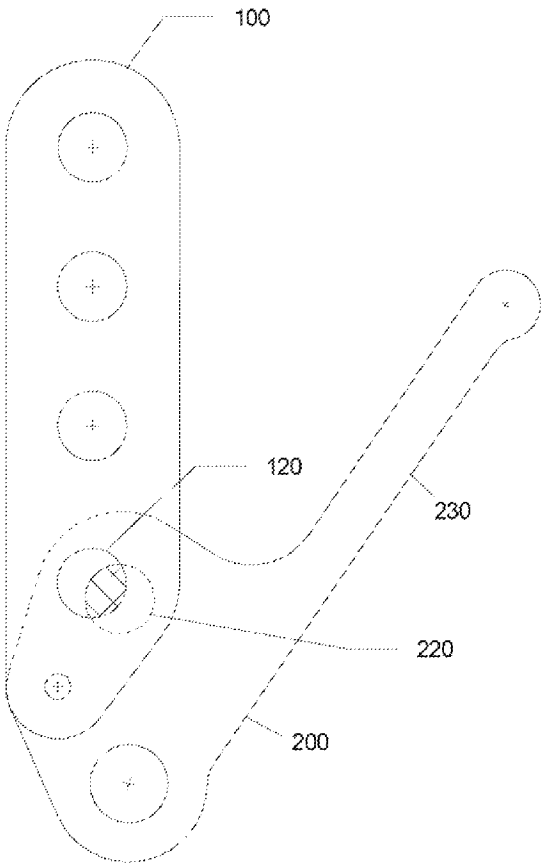
FIG. 4c is a front view of the device, configured in a double brake style, in an unclenched closed position.
Figure 4B:
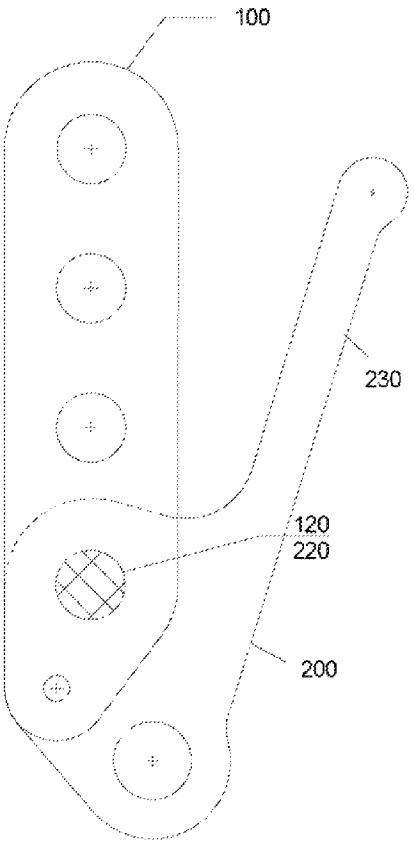
FIG. 4b is a front view of the device, configured in a double brake style, in a fully open position.
Figure 4A:
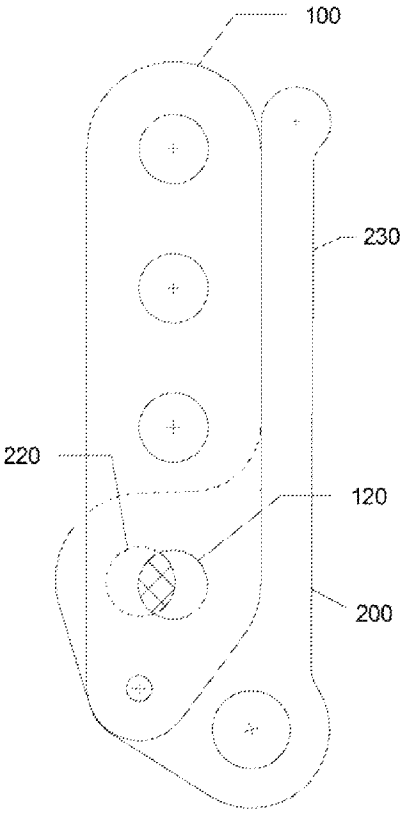
FIG. 4a is a front view of the device, configured in a double brake style, in a clenched closed position.

As will also be apparent to those skilled in the art, the device may also be made with lever geometry that may, in addition to automatically stopping the descent when the operator fails to squeeze the lever (i.e. fully "open"), also stop the descent if the operator were to panic and squeezes the lever frantically (i.e. fully "closed"). Referring to FIGS. 4a, 4b & 4c, by manufacturing handle 230 on lever 200 at a wide angle, the holes 120 and 220 may squeeze the rope when either the handle is released, as in FIG. 4c, or when the lever is fully squeezed (such as might result in a panicked response), as in FIG. 4a. The rope may pass through concentric holes 120 and 220 when lever 200 is in a neutral position approximately midway between fully open and fully closed, as in FIG. 4b. This geometry allows holes 120 and 220 to diverge in either direction.

Figures 5A, 5B, 5C:
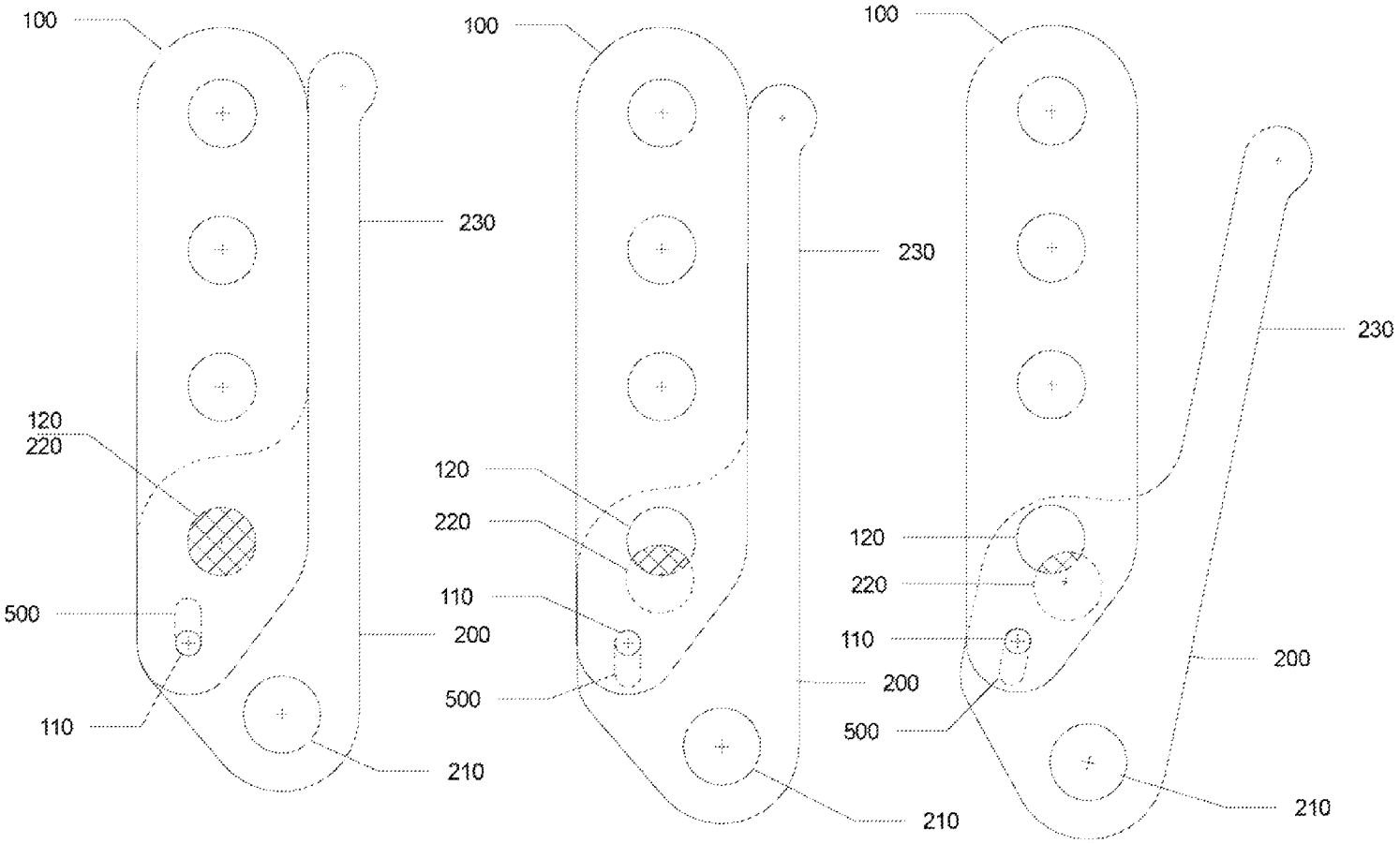
FIG. 5a is a front view of the device, configured with a slotted hinge hole, in a fully open position.
FIG. 5b is a front view of the device, configured with a slotted hinge hole, in an increased friction position.
FIG. 5c is a front view of the device, configured with a slotted hinge hole, in a closed position.
Figure 6B:
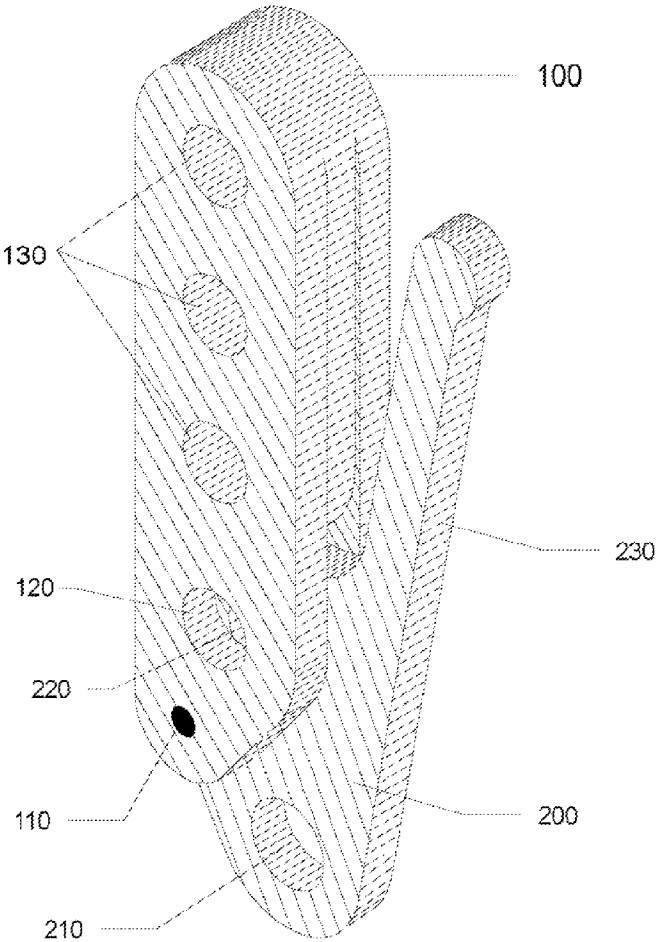
FIG. 6b is a three dimensional perspective view of the device in an unclenched position.
Figure 6A:
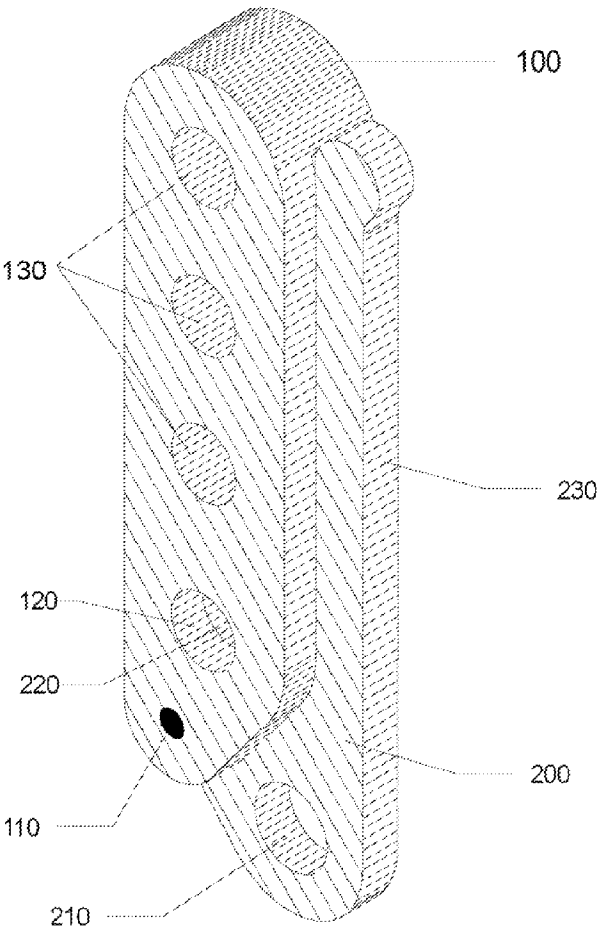
FIG. 6a is a three dimensional perspective view of the device in a clenched position.

Referring also to FIGS. 5a, 5b & 5c, in another embodiment lever 200 may be attached with variable hinge geometry by means of slotted hinge hole 500. Slotted hinge hole 500 may allow lever 200 to slip linearly versus bar 100 without rotation so that even with handle 230 on lever 200 fully squeezed, holes 120 and 220 are no longer fully concentric, as shown in FIG. 5b. This would allow the amount of friction with handle 230 on lever 200 being fully squeezed to be varied, further depending on rope size and length of slotted hinge hole 500, to provide a base level of friction. Further operation of handle 230, as shown in FIG. 5c, such as rotating under the load attached to point 210, may increase the friction, ultimately to the point of stopping the load. If minimum friction in the device is desired, the operator may fully squeeze lever 200 while simultaneously pulling the device toward attachment hole 210. This will push lever 200 back into bar 100 and fully open holes 120 and 220 to minimize friction. This method of operation may be useful in minimizing friction in the device in situations such as, but not limited to, a horizontal egress situation prior to exiting a building vertically.

Figure 7B:
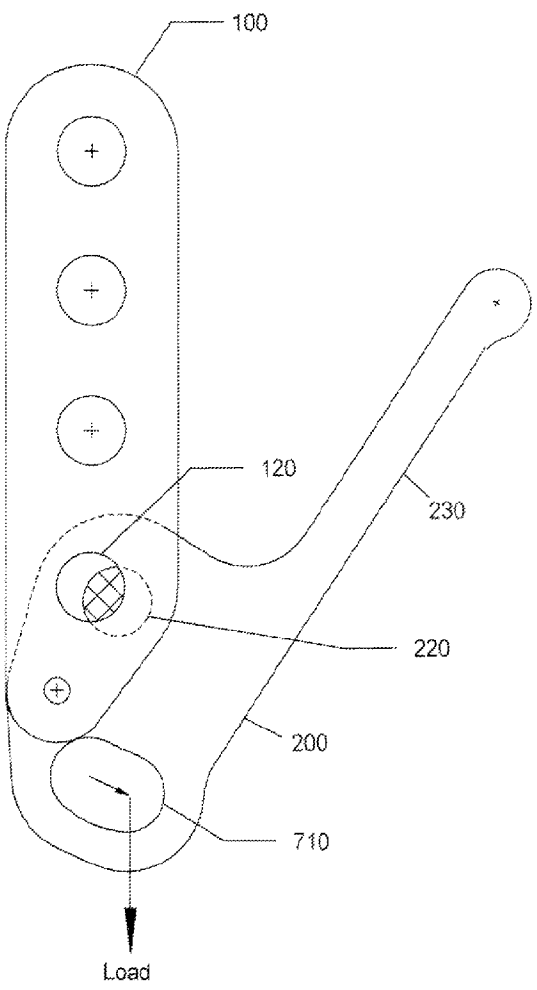
FIG. 7b is a front view of the device with an alternate attachment hole showing direction of force from an attached load while configured in a double brake style, in an unclenched closed position.
Figure 7A:
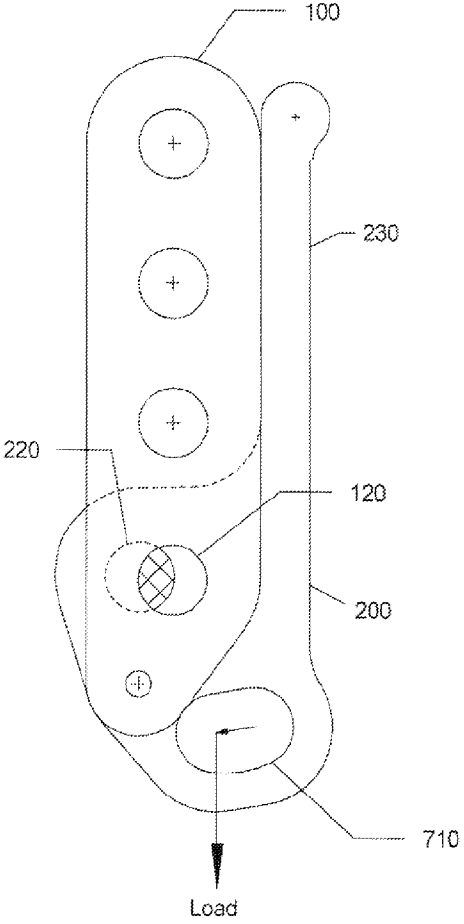
FIG. 7a is a front view of the device with an alternate attachment hole showing direction of force from an attached load while configured in a double brake style, in a clenched closed position.

Referring also to FIGS. 7a & 7b, attachment hole 710 may be configured as an elongated hole or in alternative shapes so that the direction of force applied by an attached load may shift as lever 200 is opened or closed. Such shifting may allow the force to assist fully closing or fully opening lever 200, or otherwise affect ease of controlling lever 200.

Alternative embodiments may further alter the connection between bar 100 and lever 200. The connection between bar and lever may be non-pivotal, such as engaging a constriction mechanism when slid together or pulled apart.

In order to meet National Fire Protection Association (NFPA) standards as an escape device, the device may be made of materials such that, when assembled, it may withstand loads in excess of 13.5 kilonewtons. Production to withstand lesser force may also be done to create the device for use in non-emergency lesser load situations.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A descent control device, consisting of:

three connected singular pieces;

the first singular piece comprising a bar of a width to be gripped by one hand, the bar having:

a plurality *of* path holes fully through the bar from one exposed side to another exposed side, the [a] plurality *of* path holes aligned approximately linear and defining a rope path, each path hole having a rounded surface edge;

a rope control hole fully through the bar, the rope control hole positioned towards an end of the bar and aligned approximately linear with the [three] *plurality of* path holes;

a horizontal slot in a side of the bar, the horizontal slot encompassing the control hole; and a hinge hole;

the second singular piece comprising a lever connected to the bar at the hinge hole, the lever having:

an attachment hole for connecting to an external load; and a constricting hole fully through the lever from one exposed side to another exposed side;

the third singular piece comprising a hinge pin pivotally connecting the lever to the bar at the hinge hole such that the lever moves on a plane perpendicular to a plane defined by the path holes through the bar;

wherein the lever fits into the slot of the bar such that when fully closed against the bar, and without interfering with the path holes, the constricting hole of the lever overlaps with the control hole of the bar creating an open path through the control hole and path holes for a rope, and when fully open away from the bar the constricting hole is moved away from alignment with the control hole therein constricting the rope path; and wherein applying force at the attachment hole in a direction away from the bar will pivot the lever away from the bar, thereby constricting the passage of a rope through the space formed by the control hole and the constricting hole.

2. The descent control device of claim 1, wherein a surface edge of each hole is rounded.

3. The descent control device of claim 1, wherein the hinge hole comprises a slotted hinge hole.

* * * * *